3,002,952
INITIATORS FOR THE POLYMERIZATION OF FORMALDEHYDE

Timothy Edmond O'Connor, Brandywine Hundred, Del., assignor to E. I. du Pont de Nemours and Company, Wilmington, Del., a corporation of Delaware
No Drawing. Filed Sept. 22, 1959, Ser. No. 841,452
12 Claims. (Cl. 260—67)

This invention relates to the polymerization of formaldehyde and more particularly to a novel process for the polymerization of monomeric formaldehyde to a high molecular weight polymer using an amine salt of a Friedel-Crafts catalyst.

The polymerization of monomeric formaldehyde to solid polymers is known in the art and several processes have been developed using various initiators. This invention provides a process using new and different class of initiators.

An object of this invention is to provide a new and useful process for the polymerization of monomeric formaldehyde to high molecular weight, normally solid polyoxymethylene. A further object of this invention is to provide a new class of initiators for the polymerization of formaldehyde to high molecular weight, normally solid polyoxymethylene. Other objects will appear hereinafter.

The objects of this invention may be accomplished by contacting substantially anhydrous monomeric formaldehyde with a tertiary amine salt of a Friedel-Crafts catalyst and recovering high molecular weight polyoxymethylene formed thereby. In accordance with the present invention, it was discovered that tertiary amine salts of aluminum chloride, ferric chloride, antimony chloride, boron trifluoride, zinc chloride, titanium tetrachloride, and tin tetrachloride were particularly effective in producing high molecular weight polyoxymethylene.

The preferred Friedel-Crafts catalyst for forming the initiators of this invention include boron trifluoride, tin tetrachloride, titanium tetrachloride, and aluminum trichloride. Preferably, triethylamine and tributylamine are used to prepare the catalyst of the present invention. Specific examples of other tertiary amines which may be used in the practice of the present invention include dimethylstearylamine, dimethylcyclohexylamine, dimethylbutylamine, diethylstearylamine, diethylcyclohexylamine, diethylbutylamine, and pyridine.

As used herein, the term "Friedel-Crafts catalyst" is meant to include all acidic metal halides that is, all metal halides having acidic properties. Specific examples of metal halides which are useful in the practice of the present invention include aluminum trichloride, aluminum tribromide, aluminum triiodide, aluminum trifluoride, tin tetrachloride, tin tetrafluoride, tin tetrabromide, tin tetraiodide, ferric chloride, ferric bromide, ferric fluoride, ferrous fluoride, ferrous bromide, ferrous chloride, titanium tetrachloride, titanium tetrabromide, zinc bromide, zinc fluoride, zinc chloride, boron trifluoride, boron trichloride, antimony trichloride, antimony trifluoride, antimony tribromide, antimony triiodide, antimony pentachloride, antimony pentafluoride, lead dibromide, lead difluoride, cobalt dibromide, cobalt chloride and cobalt fluoride. Generally, aluminum trichloride and boron trifluoride are chosen, since they are readily commercially available.

As used herein, inherent viscosities have been measured at 150° C. on solutions of 0.5 gram of polymer and 1 gram diphenylamine in 100 milliliters of dimethylformamide. The formula for inherent viscosity is reported by L. H. Cragg in Journal of Colloidal Science 1, 261–9 (May 1946) and is expressed as follows:

$$\text{Inherent viscosity} = \frac{\ln \text{relative viscosity}}{C}$$

where ln relative viscosity = the natural logarithm of the ratio of solution viscosity to solvent viscosity, and $C$=concentration of solute solution (grams of polymer per 100 mls. solution). Inherent viscosities measured in p-chlorophenol have a value of approximately twice the value obtained by measurement in dimethylformamide, through the general range of inherent viscosities used herein.

The term "high molecular weight" as used herein shall mean an inherent viscosity of at least 0.40 in dimethylformamide. An inherent viscosity of 0.40 would correspond approximately to the number average molecular weight of 8,000 to 13,000. Unless otherwise noted, all parts and percentages used herein refer to parts and percentages by weight.

The following examples will serve to illustrate various aspects of this invention.

Example I

Monomeric formaldehyde was generated by pyrolyzing cyclohexyl hemiformal at 110° C. Pyrolysis vapors were purified by passing them through a series of three U-tubes maintained at 0° C., the first tube being empty and the remaining two tubes being filled with stainless steel packing. The formaldehyde vapors leaving the U-tubes were then passed into a reaction medium comprising 20 ml. of ethylvinylether and 250 ml. of heptane containing 1.6 millimoles of stannic chloride-triethylamine. After six minutes, the reaction was stopped, because the polymer slurry was too thick to stir. There was recovered 14 grams of polyoxymethylene exhibiting an inherent viscosity in dimethylformamide of 1.29. Analysis of the product indicated that none of the ethylvinylether has copolymerized.

Example II

Monomeric formaldehyde was generated and purified as described in Example I, and was then passed into the reaction medium of 250 milliliters heptane containing 1.6 millimoles of boron trifluoride-triethylamine. The reaction medium was maintained at a temperature of 4° C. to 20° C. over a reaction period of 10 minutes. There was recovered 12 grams of polyoxymethylene having an inherent viscosity in dimethylformamide of 0.58.

Example III

Monomeric formaldehyde was generated and purified as described in Example I, and was then passed into the reaction medium of 250 milliliters of heptane containing .03 millimole of stannic chloride-dimethylstearylamine. The reaction medium was maintained at a temperature of 4° C. to 26° C. over a reaction period of three minutes. There was recovered 7.9 grams of polyoxymethylene having an inherent viscosity in dimethylformamide of 0.43.

Example IV

Monomeric formaldehyde was generated and purified as described in Example I, and was then passed into the reaction medium of 200 milliliters of heptane containing 0.03 gram of titanium tetrachloride-dimethylstearylamine. The reaction medium was maintained at a temperature of 4° C. to 6° C. over a period of 10 minutes. There was recovered normally solid polyoxymethylene.

Example V

Monomeric formaldehyde was generated and purified as described in Example I, and was then passed into the reaction medium of 250 milliliters heptane containing 0.03 millimole of aluminum trichloride-dimethylstearylamine. The reaction medium was maintained at a temperature of 4° C. to 20° C. over a reaction period of 10.5 minutes. There was recovered 11.4 grams of polyoxymethylene having an inherent viscosity in dimethylformamide of 0.44. Substantially the same results are obtained by substituting aluminum trichloride-dimethylcyclohexylamine for the aluminum trichloride-dimethylstearylamine of this example.

*Example VI*

Monomeric formaldehyde was generated and purified as described in Example I, and was then passed into the reaction medium of 300 milliliters of heptane containing 0.1 gram of boron trifluoride-pyridine. The reaction medium was maintained at a temperature of 10° C. to 13° C. over a period of 25 minutes. There was recovered 2.5 grams of high molecular weight, normally solid polyoxymethylene.

Substantially the same results are obtained by substituting for the catalysts of these examples any tertiary amine salt of a Friedel-Crafts catalyst.

The foregoing examples have been submitted to illustrate certain preferred embodiments, and are not to be construed as limitations on the invention.

The catalyst of the present invention is readily prepared. It is only necessary to mix the tertiary amine and the Friedel-Crafts catalyst in a suitable solvent. If desired, the catalyst may be prepared in situ in the reaction mixture.

The exact concentration of the initiator is not critical; it can be varied over a wide range, although it may be said, in general, one should use 1 milligram to 1000 milligrams of initiator per liter of reaction medium, and preferably from about 1 milligram to 400 milligrams of initiator per liter of reaction medium.

While the reaction medium is not necessary to carry out this invention, it is generally desirable to use the reaction medium to provide better control of the process, better contact of the monomer and the initiator, and easier handling of the polymer product created. The reaction medium may include any of a variety of compounds which are inert to the reactants and the product. Suitable reaction media include the aliphatic, cycloaliphatic, and aromatic hydrocarbons, hydrocarbon halides, esters, etc. The preferred reaction mediums are hydrocarbons containing 3 to 10 carbon atoms such as propane, butane, pentane, hexane, heptane, octane, nonane, decane, cyclohexane, decahydronaphthalene, benzene, toluene, and zylene.

The temperature and pressure of the reaction are not critical. The reaction is carried out in a liquid reaction medium which is generally maintained at a temperature from about −110° C. to about 100° C., the preferred range being −25° C. to 75° C. The preferred pressure is ambient atmospheric pressure, although sub-atmospheric and super-atmospheric pressures may be used if desired.

It is preferred to use substantially anhydrous monomer in this process. Preparation of monomeric formaldehyde is well known in the art; desirable processes for the preparation of high purity monomeric formaldehyde are disclosed in the United States Letters Patent 2,780,652 issued to Frederick William Gander on February 15, 1957; 2,824,051 issued to Richard Oliver Elder on February 18, 1958; 2,848,500 issued to Dennis Light Funck on August 19, 1958; and others known to those skilled in the art. Other usable procedures include the pyrolysis of paraformaldehyde or other low-molecular weight polymers of formaldehyde followed by a process for dehydrating the pyrolysis vapors.

The process of this invention yields tough, high molecular weight polymers which may be converted to shaped articles such as filaments, films, fibers, rods, tubes, pipe, molded objects, and other articles having a high degree of toughness and other desirable and useful properties.

I claim:
1. A process for preparing high molecular weight polyoxymethylene which comprises contacting substantially anhydrous monomeric formaldehyde in an inert liquid reaction medium with 1–1000 milligrams per liter of said reaction medium of a polymerization initiator consisting essentially of a tertiary amine salt of a Friedel-Crafts metal halide at a temperature of −110° to 100° C. and recovering high molecular weight polyoxymethylene formed thereby.

2. A process for preparing high molecular weight polyoxymethylene which comprises contacting substantially anhydrous monomeric formaldehyde in an inert liquid reaction medium with 1–1000 milligrams per liter of said reaction medium of a polymerization initiator consisting essentially of a tertiary amine salt of an acidic metal halide wherein the acidic metal halide radical is selected from the class consisting of aluminum trichloride, titanium tetrachloride, boron trifluoride, and tin tetrachloride at a temperature of −110° to 100° C. and recovering high molecular weight polyoxymethylene formed thereby.

3. A process for preparing high molecular weight polyoxymethylene which comprises contacting substantially anhydrous monomeric formaldehyde in an inert liquid reaction medium with 1–1000 milligrams per liter of said reaction medium of the triethylamine salt of aluminum trichloride at a temperature of −110° to 100° C. and recovering high molecular weight polyoxymethylene formed thereby.

4. A process for preparing high molecular weight polyoxymethylene which comprises contacting substantially anhydrous monomeric formaldehyde in an inert liquid reaction medium with 1–1000 milligrams per liter of said reaction medium of the triethylamine salt of titanium tetrachloride at a temperature of −110° to 100° C. and recovering high molecular weight polyoxymethylene formed thereby.

5. A process for preparing high molecular weight polyoxymethylene which comprises contacting substantially anhydrous monomeric formaldehyde in an inert liquid reaction medium with 1–1000 milligrams per liter of said reaction medium of the triethylamine salt of boron trifluoride at a temperature of −110° to 100° C. and recovering high molecular weight polyoxymethylene formed thereby.

6. A process for preparing high molecular weight polyoxymethylene which comprises contacting substantially anhydrous monomeric formaldehyde in an inert liquid reaction medium with 1–1000 milligrams per liter of said reaction medium of the triethylamine salt of tin tetrachloride at a temperature of −110° to 100° C. and recovering high molecular weight polyoxymethylene formed thereby.

7. A process for preparing high molecular weight polyoxymethylene which comprises contacting substantially anhydrous monomeric formaldehyde in an inert liquid reaction medium with 1–1000 milligrams per liter of said reaction medium of the tributylamine salt of aluminum chloride at a temperature of −110° to 100° C. and recovering high molecular weight polyoxymethylene formed thereby.

8. A process for preparing high molecular weight polyoxymethylene which comprises contacting substantially anhydrous monomeric formaldehyde in an inert liquid reaction medium with 1–1000 milligrams per liter of said reaction medium of the tributylamine salt of titanium tetrachloride at a temperature of −110° to 100° and recovering high molecular weight polyoxymethylene formed thereby.

9. A process for preparing high molecular weight polyoxymethylene which comprises contacting substantially anhydrous monomeric formaldehyde in an inert liquid reaction medium with 1–1000 milligrams per liter of said reaction medium of the tributylamine salt of tin tetrachloride at a temperature of —110° to 110° C. and recovering high molecular weight polyoxymethylene formed thereby.

10. A process for preparing high molecular weight polyoxymethylene which comprises contacting substantially anhydrous monomeric formaldehyde in an inert liquid reaction medium with 1–1000 milligrams per liter of said reaction medium of the tributylamine salt of boron trifluoride at a temperature of —110° to 100° C. and recovering high molecular weight polyoxymethylene formed thereby.

11. A process for preparing high molecular weight polyoxymethylene which comprises introducing substantially anhydrous monomeric formaldehyde into a reactor containing an agitated reaction medium which is a liquid hydrocarbon of 3 to 10 carbon atoms; said reaction medium having dissolved in each liter thereof 1 to 400 milligrams of the triethylamine salt of boron trifluoride; maintaining the reaction medium at a temperature of —25° C. to 75° C. until polymer particles have formed, and recovering a dispersion of high molecular weight polyoxymethylene in said reaction medium.

12. A process for preparing high molecular weight polyoxymethylene which comprises introducing substantially anhydrous monomeric formaldehyde into a reactor containing an agitated reaction medium which is a liquid hydrocarbon of 3 to 10 carbon atoms; said reaction medium having dissolved in each liter thereof 1 to 400 milligrams of the triethylamine salt of tin tetrachloride; maintaining the reaction medium at a temperature of —25° C. to 75° C. until polymeric particles have formed, and recovering a dispersion of high molecular weight polyoxymethylene in said reaction medium.

References Cited in the file of this patent
FOREIGN PATENTS 793,673   Great Britain _____ Apr. 23, 1958

UNITED STATES PATENT OFFICE
CERTIFICATE OF CORRECTION

Patent No. 3,002,952                                    October 3, 1961

Timothy Edmond O'Connor

It is hereby certified that error appears in the above numbered patent requiring correction and that the said Letters Patent should read as corrected below.

Column 4, line 69, for "100°" read -- 100° C. --; column 5, line 2, for "110° C." read -- 100° C. --.

Signed and sealed this 6th day of March 1962.

(SEAL)
Attest:

ERNEST W. SWIDER                                    DAVID L. LADD
Attesting Officer                                     Commissioner of Patents